United States Patent Office 3,414,715
Patented Dec. 3, 1968

3,414,715
ARRANGEMENT FOR EVALUATING THE DATA CONTENT OF PUNCHED TAPE, ESPECIALLY FOR CONTROLLING TYPE-SETTING MACHINES

Wolfgang Peuser, Ebermannstadt, Upper Franconia, and Oskar Vierling, Pretzfelder Str. 23, Ebermannstadt, Upper Franconia, Germany; said Peuser assignor to said Vierling Filed Oct. 28, 1964, Ser. No. 407,167
Claims priority, application Germany, Oct. 31, 1963, V 24,784
4 Claims. (Cl. 235—61.7)

ABSTRACT OF THE DISCLOSURE

The control of the feed velocity of a punch tape in which the elements of coded information are arranged parallel to each other along different tracks of the tape to be scanned simultaneously in which control mechanism for changing the speed of the transport of the punch tape is provided and two reading means located directly one behind the other when viewed in the direction of movement of the tape to read simultaneously successive coded combinations of coded information. Storage means are present for storing non-functional code combinations and comparison means responsive to the code combination read by the reading means first reached by the punch tape and the non-functional code combination supplied by the storage means to supply an accelerating signal for the tape control mechanism when comparison is established.

Figure 1:
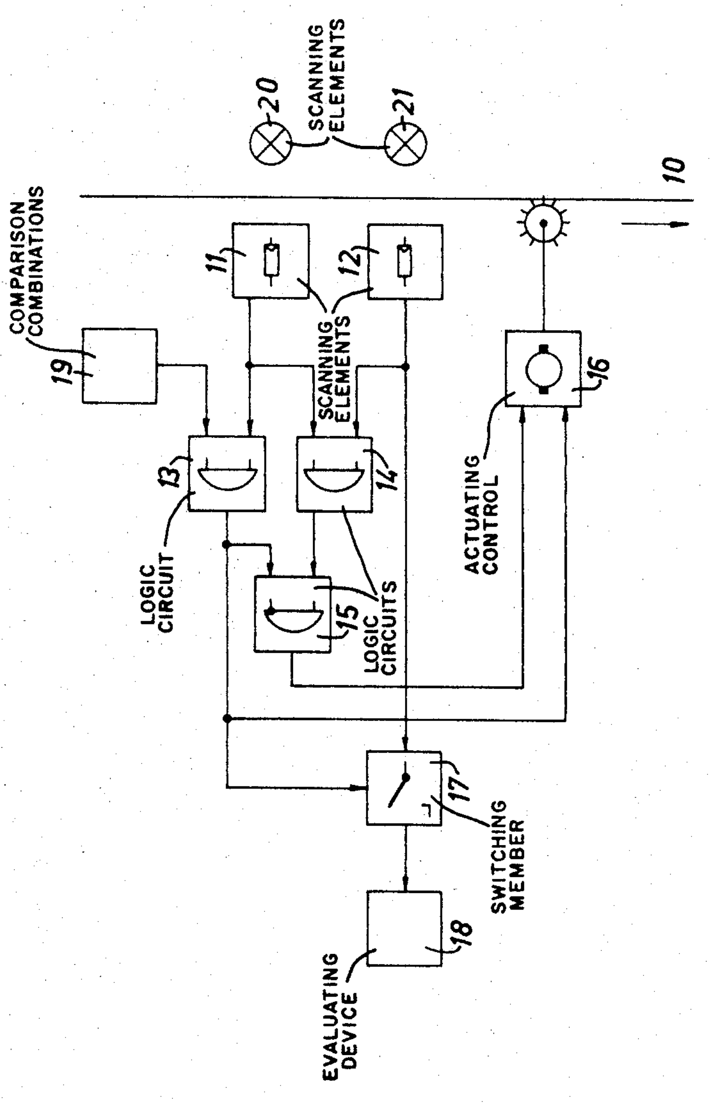

The invention relates to improvements in apparatus for processing punched tape and particularly apparatus for controlling type-setting machines and the like.

Punched tape scanners for controlling mechanical apparatus are known, as well as electromagnetic evaluating members connected to the scanners, such as relays and whose contacts form a decoding circuit for the punched tape code for causing the transmission of comparatively large outputs to working resistors, or electromagnets operating a mechanical code bar arrangement.

These punched tape apparatus equipped with mechanical or photoelectric scanning have several disadvantages which affect their operation adversely. Thus, they do not take into consideration that setting machines or typewriters are not capable of operating the same matrix or type at the same speed as different ones because with identical matrices and types the same lever transmission must be operated twice and the second movement can be effected only after the termination of the first.

Although it is known in the control of type setting machines to store all signs for the duration of one stroke and to select the sequence so that it is sufficient for different signs, but with successive identical signs one stroke is omitted. This method is no more reliable than the usual storage devices (usually bistable multivibrator circuits which must be arranged adjacent to strong electromagnets); in addition, these methods are expensive and cannot solve a second problem encountered in practical punched tape operation. Punched tapes contain a substantial number of code combinations to which the machine to be controlled must not respond. These are, for example, punched out errors, data-free steps and combinations which should trigger off a function only with certain and limited applications. During the strokes containing such signs, the typewriters or type-setting machines must generally interrupt their operation. It has already been proposed at least to shorten these interruptions, but this can be achieved only incompletely with conventional tape scanners. Since a combination can be recognized as being data-less only after it has been scanned, the punched tape has already come to a standstill and must again be accelerated and stopped in order to present the next and possibly effective combination to the scanner.

In order to single out scanning faults, it is frequently possible to use twin scanning by providing two scanners which may be arranged tightly side by side and scan simultaneously the same coding combination in the punched tape, or, where simultaneous scanning is impossible, e.g. with mechanical arrangements, a multiple scanning is effected and the result is used in special memories and controls for these memories for controlling the correct operation of the scanner. However, in view of their application, these arrangements cannot remove the above-mentioned defects in punched tape operation.

The invention has for an object the improving of the evaluation of punched tape so that the deficiencies of known apparatus may be overcome. According to the invention, there is provided an additional scanning device arranged upstream of the known scanning device and connected to a logic circuit which, possibly through a power stage, is connected to a control device and preferably to the feed control of the punched tape.

In order to reduce the resulting waiting times caused by coding combinations which do not actuate the appliance to be controlled, the logic circuit connected to the additional scanner consists of a circuit for comparing the code combination scanned by the additional scanner with a predetermined code combination, wherein the output of this circuit is connected to the actuating device and applies thereto an acceleration signal if the two compared code combinations agree.

Since no evaluation takes place during the scanning of the data-less or occasionally ineffective code combinations, these need not be decoded. With regard to the operating conditions of the evaluating device, it is technically advantageous and timesaving if the evaluating device does not respond to these combinations at all. Accordingly, one embodiment of the invention is such that the logic circuit is connected with a device deactivating the energization during the accelerated transport of the punched tape or interrupting the flow of energy through the electromagnetic paths.

In the case of two successive identical code combinations which each trigger off a function of the controlled appliance, the appliance requires a longer time for the processing than with different combinations. The invention has the object of taking this delay into consideration without retarding the normal operation. Accordingly, a further embodiment of the invention is characterized in that the logic circuit connected in series with the additional scanner consists of a comparison circuit for the additionally scanned code combination and the code combination scanned by the known scanner, the output of this circuit being connected with the actuating control and supplying a signal delaying the transport after the scanning when the two compared signals agree. On the other hand, in the case of two successive data-less code combinations, the acceleration circuit must be effective and according to the invention there is a logic link whereby the acceleration circuit is given preference over the delay circuit.

Figure 2:
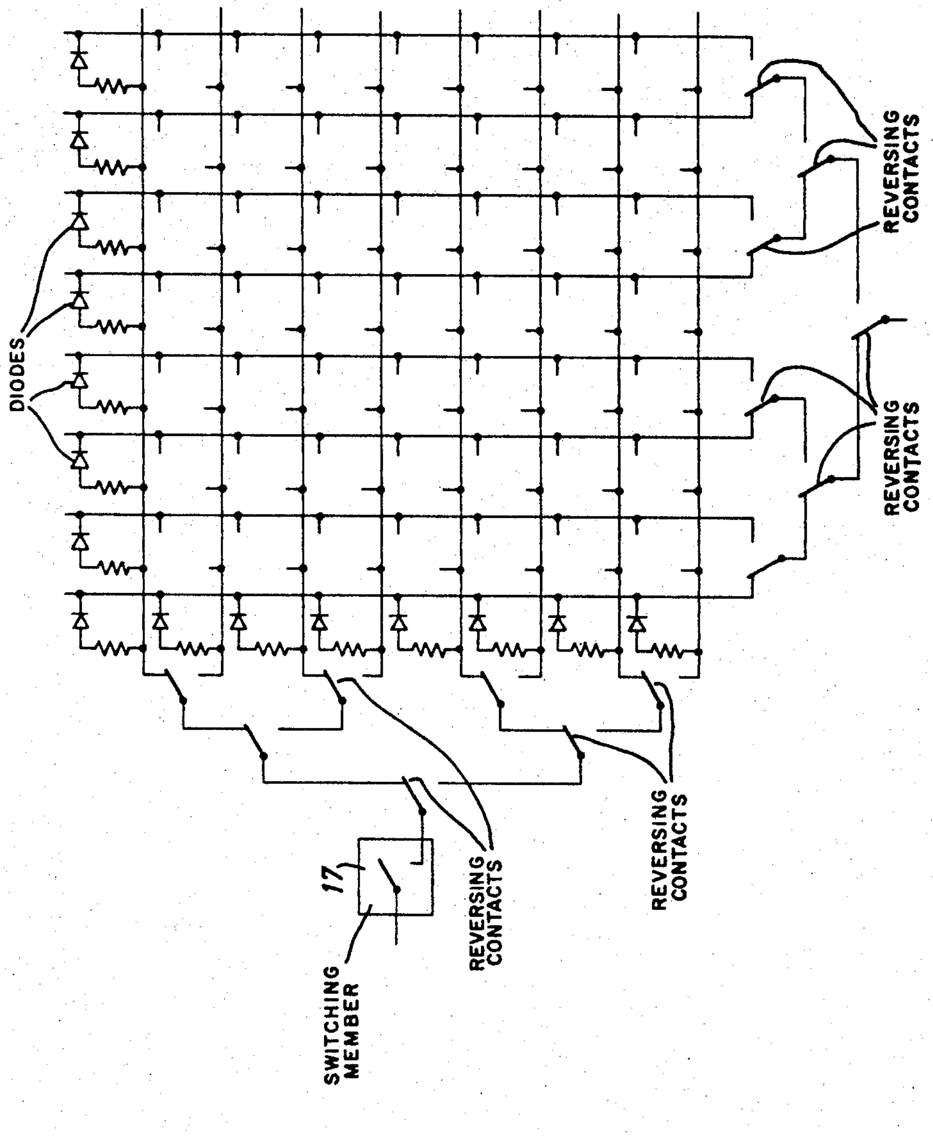
Figure 3:
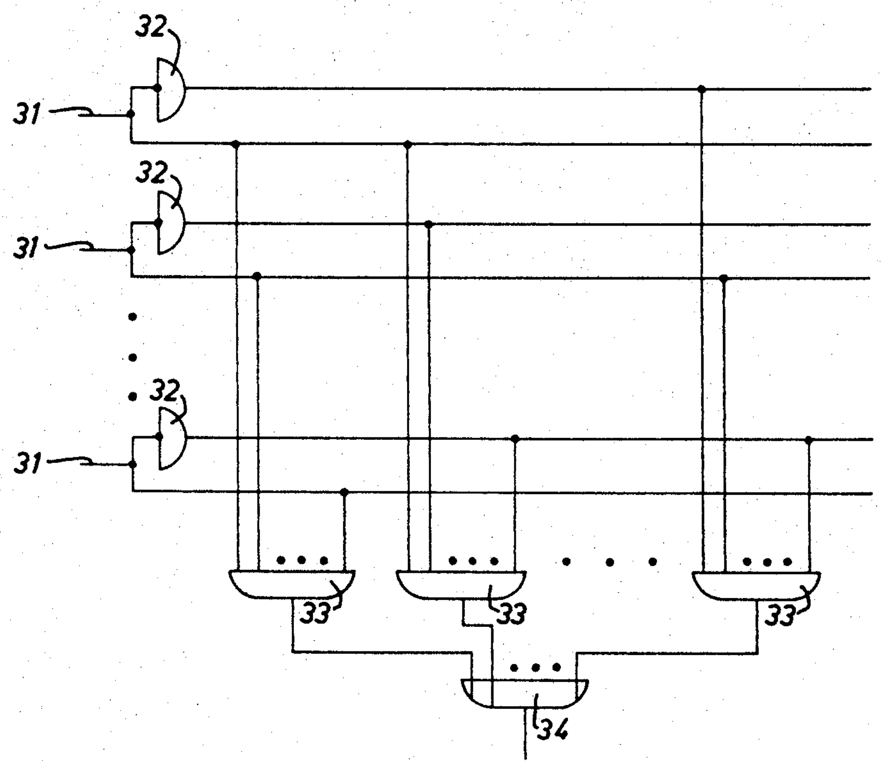
Figure 4:
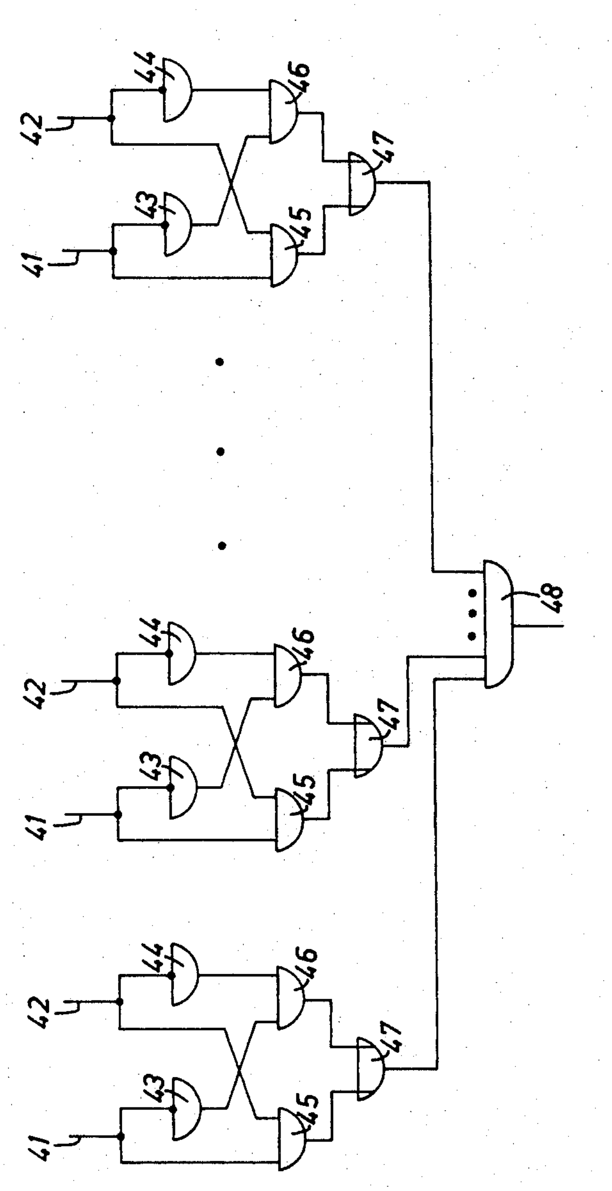

The invention will be further described with reference to an embodiment shown in the accompanying drawings, wherein:

FIG. 1 is a schematic showing of a decoding arrangement for translating code combinations from a tape to machine control functions, FIG. 2 is a circuit diagram showing a modified pyramid decoding arrangement, FIG. 3 depicts a logic circuit for supplying predetermined code combinations, and FIG. 4 is a detailed wiring diagram for a logic comparison circuit.

FIG. 1 shows a punched tape 10 containing the code combinations normal to the plane of the drawing. Each combination has a certain position on the tape and the gap between the positions corresponds to the gap between scanning elements 11 and 12 or 20 and 21 shown on an enlarged scale. In photo-electric scanning, the elements 20 and 21 are incandescent lamps and the elements 11 and 12 light sensitive components such as photoresistors, photocells or photodiodes. To the scanner 12 is connected, possibly through amplifiers, an evaluating device 18 for decoding the electric signals corresponding to the code combination and translating them into machine functions. According to the number of elements of the code on which the punched combination is based, the scanner 12 contains several elements leading to the same evaluating device 18. The decoding is effected in the decoder 18 by a known relay circuit with outputs branched in geometrical progression. In order to avoid the large amount of contacts resulting from the pure application of the relay pyramid decoding principle ($2^n-1$ contacts for $2^n$ outputs if $n$ is the number of traces on the punched tape), a circuit according to FIG. 2 may be used comprising contacts, electronic switches and $2^n$ diodes but only $2\ (2^{n/2}-1)$ reversing contacts. In the example shown for decoding a sextuple code, 64 diodes and 14 reversing contacts are required. For reasons of reliability and price, it is desirable to reduce the number of contacts; on the other hand contrary to a purely electronic decoding circuit, contacts permit a high current flux through the evaluating members, e.g. the type magnets of electrical typewriters and the like.

A purely electronic evaluation may comprise, for example, a number of AND circuits requiring also $n.2^n$ diodes and $2^n$ amplifiers since these AND circuits are not suitable for directly controlling the evaluating members used in this case.

Upstream of the scanner 12 there is a second scanner 11 which also has as many scanning elements as there are tracks in the tape, that is, 6 scanning elements for a sextuple code. The outputs of the scanner 11 lead to a logic circuit to which is also connected the input device for the comparison combinations supplied by circuit 19. An embodiment of this logic circuit is shown in FIG. 3 in which the comparison combinations are formed by simple wiring. To this end, the data available at the $n$ outputs 31 of the scanner 11 are complemented by reversing circuits 32 and each data lead or its complementary value lead is connected with the input leads of as many $n$-fold AND circuits 33 as there are non-function code combinations to be considered. The AND circuit 31 shown in FIG. 3 left, is intended, for example, for overpunching combinations (all $n$ positions punched) the adjacent one for another non-function combination (hole, $n-1$ unpunched positions). The outputs of the AND circuits 33 lead to an OR circuit 34 whose output corresponds to the output of the circuit 13 in FIG. 1 and is connected, possibly through amplifiers with the control of the actuating device 16 (FIG. 1) which causes, in the case of an output signal at 13 or 34, the actuating device 16 to accelerate the tape 10. At the same time, the output signal of the logic circuit 13 causes, through switching members 17, the blocking of the connection between the scanner 12 and the evaluating device 18 at a suitable point, e.g. in the decoder circuit (FIG. 2) or directly in the energizing leads for the relays controlling the decoder circuit. In this manner, all no-function combinations are passed over in the evaluation and the intervals are reduced to a theoretical minimum.

The additional scanner 11 is also connected to a logic circuit 14, connected in turn with the scanner 12 and comparing the adjacent combinations scanned by scanners 11 and 12. FIG. 4 shows an embodiment of a logical comparison circuit 14 in which 41 are the output leads of scanner 11 and 42 those of scanner 12. The number of output leads 41 and 42 corresponds to the number $n$ of the tracks of the punched tape resulting in the present embodiment in 6 output leads 41 and 42. The output leads 41 and 42 associated with the same track of the punched tape lead, on the one hand, each directly to an AND circuit 45 and on the other hand, through a reversing stage 43 or 44 yielding the complementary signal to the scanned signal, to a second AND circuit 46. The outputs of the AND circuits 45 and 46 are combined to an OR circuit 47 and the outputs of all OR circuits 47 are connected with the inputs of an $n$-fold AND circuit. The two adjacent combinations are thus first compared by tracks wherein hole-hole or no-hole-no-hole is evaluated as agreement (an output signal at 45 or 46 gives an output signal at 47) and then agreement on all tracks is determined. Only in the latter case will the output of the AND gate 48, corresponding to the output of the logic circuit 14 in FIG. 1, yield a signal which may be amplified and cause the actuating control 16 to be delayed.

The logic circuit 14 is not directly connected with the actuating device 16 but is connected through a further logic circuit 15 whereby an accelerating signal from the comparison circuit 13 is given preference over a retarding signal from the comparison circuit 14. This preference circuit 15 permits, in the case of successive occurrence of identical no-function signals, only the accelerating signal but not the retarding signal to reach the actuating device. To this end, the logic circuit 15 is constructed simply as an AND-NOT circuit whose NOT input is connected with the output of the comparison circuit 13. A control of the actuating device 16 for acceleration or deceleration may be achieved by various means according to the type of actuating device used.

With a thrust pawl drive, controlled by an impulse generator, the advance may be delayed by passing over one or more impulses. Acceleration may be achieved by moving the thrust pawl, by means of an additional magnet responding to the accelerating signal, into a position in which it rests in the second tooth of the ratchet wheel instead of in the next tooth. A particularly preferred new type of acceleration uses the resonance of the thrust pawl resulting from mass and resetting force. To this end, the accelerating signals are impulses with a frequency corresponding to the resonance frequency of the thrust pawl to which the same responds more quickly and with less energy consumption than to the impulse generator impulses. The advantages of this control are particularly apparent in the case of several no-function code combinations caused by over punching corrections.

With continuous advance, a clutch arrangement may be so controlled that with an accelerating signal the actuating arrangement is connected to a shaft rotating faster than the shaft producing the normal advance, but with a delaying signal, the device is disconnected for a certain period.

Another possibility results from the use of a stepping motor with two or more coils which are normally energized successively or simultaneously in a certain rhythm causing the main shaft rhythmically to be actuated and stopped. Acceleration may be produced by supplying to the coil arrangement in the correct phase to the armature movement signals causing the motor to run on in the original direction while a delay is produced by suppressing at least one impulse.

Since substantially known means are used with the different actuating devices an enumeration of all possibilities is superfluous.

Naturally, the object of the invention comprises also all equivalent solutions which may be applied without thereby departing from its principle.

Having thus fully described and disclosed the inven-tion, what is claimed and desired to be protected by Letters Patent is:

1. Apparatus for controlling the feed velocity of a punched tape driven by a transport, in which the elements of coded information are arranged parallel to each other along different tracks of the punched tape to be scanned simultaneously, comprising, control means for changing the speed of the transport of the punched tape; two reading means located directly one behind the other when viewed in the direction of movement of the punched tape to read simultaneously successive coded combinations of coded information; storage means storing non-functional code combinations; and comparison means responsive to the code combination read by the reading means first reached by the punched tape and the non-functional code combination supplied by the storage means to supply an accelerating signal for the tape control means when comparison is established.

2. The apparatus of claim 1 wherein the signal fed to the control means when comparison between the two reading means is established comprises a retarding signal for slowing the speed of the transport.

3. The apparatus of claim 1 further comprising means for evaluating the coded combination read by the second reading means; switching means disposed between the second reading means and the evaluating means and connected to the comparison means.

4. An arrangement for controlling the feed velocity of a punched tape, in which the elements of the cited information are arranged parallel to each other along different tracks of the tape and are read simultaneously, comprising: a control device for accelerating or retarding the punched tape transport; two scanners located directly one behind the other when viewed in the direction of movement of the punched tape and adapted to read simultaneously successive code combinations; a memory containing non-functional code combinations; a first comparator comparing the code combination ready by the first scanner with the non-functional code combinations in the memory and supplies in the case of agreement a signal accelerating the transport of the punched tape; a second comparator which compares the code combinations supplied by the two scanners and supplies in the case of agreement a retarding signal for the punched tape; and a logic circuit connected to the two comparators which, with simultaneity of an accelerating signal from one comparator and a retarding signal from the other comparator, permits only the accelerating signal to be applied to the punched tape transport.

References Cited

UNITED STATES PATENTS

| | | | |
|---|---|---|---|
| 2,952,008 | 9/1960 | Mitchell ------------ | 340—174 |
| 2,865,487 | 12/1958 | Hildebranot ---------- | 197—20 |
| 3,274,337 | 9/1966 | Van Berkel ---------- | 178—17 |

MAYNARD R. WILBUR, *Primary Examiner.*

T. J. SLOYAN, *Assistant Examiner.*